Patented Sept. 6, 1932

1,875,372

UNITED STATES PATENT OFFICE

HERBERT A. ENDRES, OF AKRON, OHIO, ASSIGNOR TO THE GOODYEAR TIRE & RUBBER COMPANY, OF AKRON, OHIO, A CORPORATION OF OHIO

METHOD OF TREATING RUBBER COMPOUNDS AND COMPOSITION OBTAINED THEREBY

No Drawing.    Application filed September 27, 1930.    Serial No. 484,941.

This invention relates to the manufacture of rubber compounds and it has particular relation to methods of vulcanizing such materials.

One object of the invention is to provide a rubber compound which, prior to vulcanization, retains its tacky or adhesive characteristics even during relatively long periods of storage.

Another object of the invention is to provide a rubber compound which is less subject to scorching during the preliminary processes of milling than ordinary compounds.

Heretofore in the manufacture of rubber compounds, it has been observed that the materials, upon standing for a considerable period of time prior to vulcanization, tended to lose their tacky adhesive nature to such a degree that it was frequently difficult to stitch or roll plies of such material together by the application of pressure in accordance with the usual methods employed in the manufacture of such goods. This character of the compounds was particularly objectionable in the case of repair materials, such as sheets of compounds employed as repair materials for inner tubes of automobile tires, or for repairing the treads of the tires. It has been suggested that this loss of adhesive properties in the unvulcanized rubber was due to migration of sulphur contained in the stock to the surface thereof, where a slight incrustation was formed. This incrustation of migrated sulphur apparently prevented adequate contact between the surfaces which were to be united.

This invention consists in the discovery that migration of sulphur and resultant loss of tack in rubber stocks may effectively be prevented by employing a form of sulphur which is insoluble in most ordinary sulphur solvents and which is commonly designated as Smu. This form of sulphur may conveniently be obtained at relatively slight expense merely by heating ordinary soluble sulphur to the boiling point and then suddenly quenching the molten mass in cold water. The material thus obtained is at first of amorphous gummy nature. However, it soon sets into a hard brittle mass which may readily be ground into a powder of sufficient fineness to permit its ready incorporation into rubber.

It is found that the material obtained by thus quenching molten sulphur comprises approximately one part of insoluble sulphur (Smu) and two parts of ordinary soluble sulphur. The latter may readily be removed by treating the quenched materials with a suitable sulphur solvent, such as carbon disulphide, thus leaving substantially pure insoluble sulphur. However, for most purposes such treatment is not necessary, because the quantity of insoluble sulphur in the quenched mass, prior to extraction with a solvent is usually sufficient effectively to prevent migration of sulphur when the latter is incorporated into rubber stocks.

Although insoluble sulphur may be employed in substantially any of the ordinary rubber compounds, the following is a specific example of a material employed in the manufacture of patch stock for inner tubes:

| | Parts |
|---|---|
| Rubber | 100 |
| Zinc oxide | 3 |
| Sulphur | 4 |
| Mercaptobenzothiazole | 1.35 |
| Softener (pine tar, palm oil or similar material) | 2 |

Stocks prepared in accordance with this formula may be kept in storage over relatively long periods of time without any appreciable tendency to bloom. However, it may readily be applied to inner tubes or other materials which it is desired to repair and there subjected to vulcanization in a conventional manner. Where a temperature of approximately 260 degrees F. is employed for effecting the cure, vulcanization takes place within a period of five or ten minutes. However, the stock is not particularly sensitive to overcure. Therefore, the exact control of time and temperature is not of great importance.

In addition to its value as a non-blooming sulphur for use in rubber compounds, insoluble sulphur is also desirable in many rubber compounds, particularly those containing ultra-rapid vulcanization accelerators because of the fact that it is materially less subject to scorching or pre-vulcanization during the processes of compounding and calendering the rubber than compounds containing ordinary soluble forms of sulphur. Because of its anti-scorching characteristics, insoluble sulphur may be employed in rubber stocks containing ultra-rapid accelerators, such as diethyl amine salts of mercaptobenzothiazole which are impracticable in some commercial compounds because of the fact that they show a tendency to scorch or pre-vulcanize during the preliminary processes of milling and calendering.

The tendency of rubber compounds to scorch may readily be determined by the simple expedient of forming a pellet of compound of the desired consistency and then subjecting this pellet to a predetermined deforming weight for a definite period of time and then measuring the thickness of the pellet in order to ascertain the degree of deformation it underwent under the weight.

In the tests which were conducted in connection with the present invention, a stock to be tested, comprising the following formula, was calendered into sheets having a thickness of about 10 millimeters.

|  | Parts |
|---|---|
| Rubber | 100.0 |
| Mercaptobenzothiazole | 0.5 |
| Stearic acid | 1.5 |
| Zinc oxide | 5.0 |
| Sulphur | 3.0 |

The pellets were then cut from this sheet and were placed in an oven heated to a temperature of 70 degrees C. for various lengths of time. The pellets were removed and placed in a plastometer and subjected to a load of 5000 grams for three minutes. Upon removal of the load, the thickness of the pellets was determined after a recovery period of one minute. The comparative results obtained by thus testing two samples of material, which were identical in consistency except that one contained ordinary sulphur while the other contained insoluble sulphur, are tabulated as follows:

| Hours in oven at 70° C. | Compound I (ordinary sulphur) thickness mm. | Compound II (insoluble sulphur) thickness mm. | Difference in mm. |
|---|---|---|---|
| Original | 3.22 | 3.40 |  |
| 12 | 4.75 | 3.92 | .83 |
| 15 | 6.57 | 4.30 | 2.27 |
| 18 | 8.20 | 5.00 | 3.20 |
| 21 | 9.51 | 7.20 | 3.31 |
| 24 | 10.00 | 8.01 | 1.99 |

It is thus apparent that use of the invention constitutes an extremely simple and inexpensive method of preventing bloom and resultant loss of tack or adhesive properties in rubber compounds. It also constitutes an excellent means of preventing or at least greatly mitigating the tendency of the stock to "scorch" or partially vulcanize under the heat incident to milling and calendering rubber.

Although I have described in detail only one form which the invention may assume, it will be apparent to those skilled in the art that it is not so limited, but that various modifications may be made without departing from the spirit of the invention or from the scope of the appended claims.

What I claim is:

1. A method of preventing sulfur bloom in unvulcanized rubber compounds which comprises incorporating therein a mixture of sulfurs, said mixture comprising insoluble sulfur and no more soluble sulfur than the rubber will dissolve.

2. A method of preventing sulfur bloom in unvulcanized rubber compounds which comprises incorporating therein a mixture of sulfurs, said mixture comprising at least 35 percent insoluble sulfur.

3. A method of preventing sulfur bloom in unvulcanized rubber compounds which comprises incorporating therein sulfur, at least 35 percent of which is Smu.

4. An unvulcanized rubber compound containing sulfur, at least 35 percent of which is Smu.

5. An unvulcanized rubber compound containing a mixture of sulfurs, said mixture comprising insoluble sulfur and no more soluble sulfur than the rubber will dissolve.

6. An unvulcanized rubber compound adapted for repairing inner tubes comprising a mixture of sulfurs, said mixture including insoluble sulfur and no more soluble sulfur than the rubber will dissolve.

In witness whereof, I have hereunto signed my name.

Signed at Akron, in the county of Summit and State of Ohio, U. S. A., this 26th day of September, 1930.

HERBERT A. ENDRES.